United States Patent
Wu

(10) Patent No.: US 6,662,544 B1
(45) Date of Patent: Dec. 16, 2003

(54) CHAIN

(76) Inventor: Hua-Tien Wu, No. 30, Chungshan Rd., Render Hsiang, Tainan Hsien, Tainan Hsien (TW)

( * ) Notice: Subject to any disclaimer, the term of this patent is extended or adjusted under 35 U.S.C. 154(b) by 0 days.

(21) Appl. No.: 10/209,829

(22) Filed: Jul. 31, 2002

(51) Int. Cl.⁷ .......................... F16G 13/00; F16G 13/02
(52) U.S. Cl. ........................ 59/5; 59/4; 59/8; 59/78; 474/206; 474/209
(58) Field of Search ................ 59/4, 5, 8, 78; 474/206, 209

(56) References Cited

U.S. PATENT DOCUMENTS

| | | | | |
|---|---|---|---|---|
| 3,595,098 A | * | 7/1971 | Kumakakichi | 474/206 |
| 4,265,134 A | * | 5/1981 | Dupoyet | 59/8 |
| 4,983,147 A | * | 1/1991 | Wu | 474/206 |
| 5,151,066 A | * | 9/1992 | Wu | 474/206 |
| 5,322,483 A | * | 6/1994 | Wang | 474/206 |
| 5,465,568 A | * | 11/1995 | Wang | 59/4 |

* cited by examiner

*Primary Examiner*—David B. Jones
(74) *Attorney, Agent, or Firm*—Alan Kamrath; Rider Bennett, LLP

(57) ABSTRACT

A chain is composed of multiple units each having two outer plates, two inner plates and a pin securely connecting the outer plates to the inner plates. The inner plate has two hollow cones oppositely formed on two sides of the inner plate and two tubes each formed on a corresponding one of the hollow cones. A space between an inner face of the hollow cone and the tube is defined to receive therein oil. A rivet hole is defined to align with a pin hole in the outer plate. Therefore, after the outer plates and the inner plates are combined by the pin, the oil inside the chain unit is able to gradually flow out of the chain to lubricate the parts.

7 Claims, 3 Drawing Sheets

CHAIN

BACKGROUND OF THE INVENTION

1. Field of the Invention

The present invention relates to a chain, and more particularly to a chain having multiple chain units. Each chain unit is composed of two outer plates, two inner plates and a pin securely connecting the outer plates to the inner plates. The inner plate has two hollow cones oppositely formed on two sides of the inner plate and two tubes each formed on a corresponding one of the hollow cones. A space between an inner face of the hollow cone and the tube is defined to receive therein oil. A rivet hole is defined to align with a pin hole in the outer plate. Therefore, after the outer plates and the inner plates are combined by the pin, the oil inside the chain unit is able to gradually flow out of the chain to lubricate the parts.

2. Description of Related Art

A conventional chain is composed of multiple chain units each having an inner plate provided with inner sleeves, an outer plate with outer sleeves each received in a corresponding one of the inner sleeves and pins provided to secure the engagement between the inner plate and the outer plate. In order to improve the smoothness of the chain, some manufacturers even add in a guiding plate to the chain unit so that when the chain is in use, the guiding plate is able to adapt to the sprocket of a bicycle to smoothen the operation. However, none of the improvements mentioned or introduced to the market does any thing to improve the lubrication between parts so as to prolong the life span of the chain.

To overcome the shortcomings, the present invention tends to provide an improved chain to smoothen the operation of the chain.

SUMMARY OF THE INVENTION

The primary objective of the present invention is to provide an improved chain having therein a space to receive oil so that when the chain is in operation, the oil will gradually seep out of the space to lubricate the outer plate and the pin.

Another objective of the invention is that a tube formed in an inner face of each hollow cone has an inclined top face relative to a top face of the inner plate so that when the oil seeps the oil flows to the lower portion in the inclined top face.

Still another objective of the invention is that the tube has multiple cutouts defined in a top face of the tube so that the oil is able to flow out of the space through the cutouts.

Other objects, advantages and novel features of the invention will become more apparent from the following detailed description when taken in conjunction with the accompanying drawings.

DETAILED DESCRIPTION OF THE PREFERRED EMBODIMENT

Figure 2:
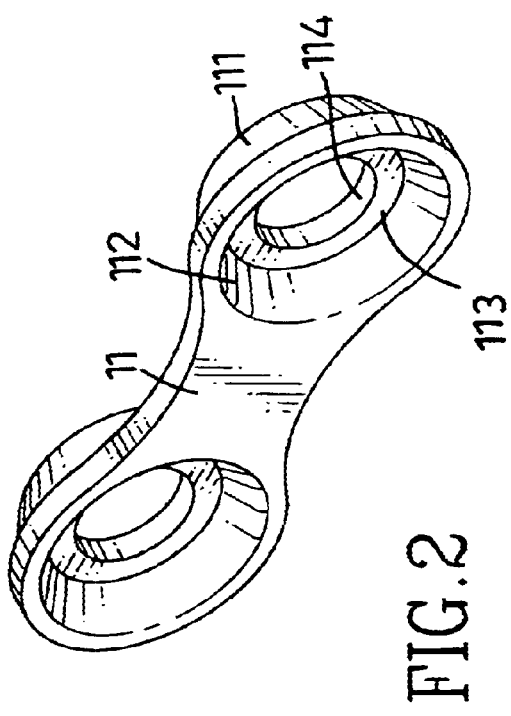
FIG. 2 is a perspective view of an inner plate.
Figure 1:
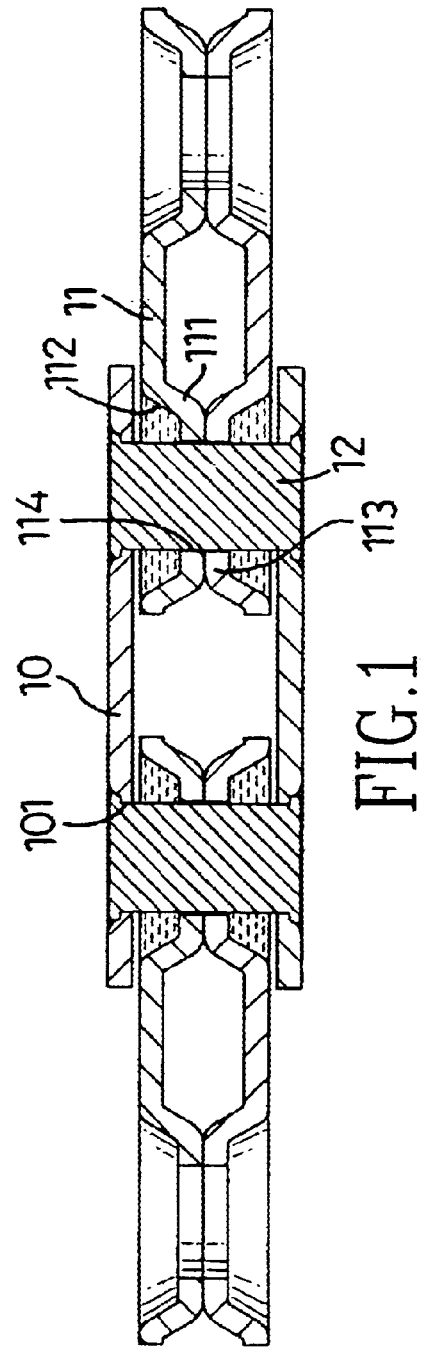
FIG. 1 is a cross sectional view showing a combination of a chain unit.

With reference to FIGS. 1 and 2, a chain in accordance of the present invention is composed of multiple chain units each having two outer plates (10), two inner plates (11) and a pin (12) to secure engagement between the outer plates (10) and the inner plates (11).

Each of the outer plates (10) has two circular faces. Each circular face defines therethrough a pin hole (101). Each of the inner plate (11) has two hollow cones (111) oppositely formed on two sides of the inner plate (10) and two tubes (113) each formed on a corresponding one of the hollow cones (111). A space (112) between an inner face of the hollow cone (111) and the tube (113) is defined to receive therein oil. A rivet hole (114) is defined to align with the pin hole (101) in the outer plate (10).

When the chain unit is assembled, two inner plates (11) are combined by engaging two tubes (113) together so that the two rivet holes (114) of the respective inner plate (11) are aligned with each other. Then two outer plates (10) are applied to a respective one of the two combined inner plates (11) with the pin holes (101) aligned with the two pin holes (114) respectively. Then a pin (12) is applied to extend through the aligned pin hole (101) and the two aligned rivet holes (114). After the chain unit is assembled, this chain unit is ready to connect to another chain unit so as to form a chain.

It is noted from FIG. 1 that when the chain is assembled, two oil receiving spaces (112) are closed by a respective outer plate (10). When the chain of the present invention is in operation, oil in the oil receiving space (112) is able to seep through the rivet holes (114) to lubricate the pin (12) and the outer plates (10) as well as the inner plates (11).

Figure 4:
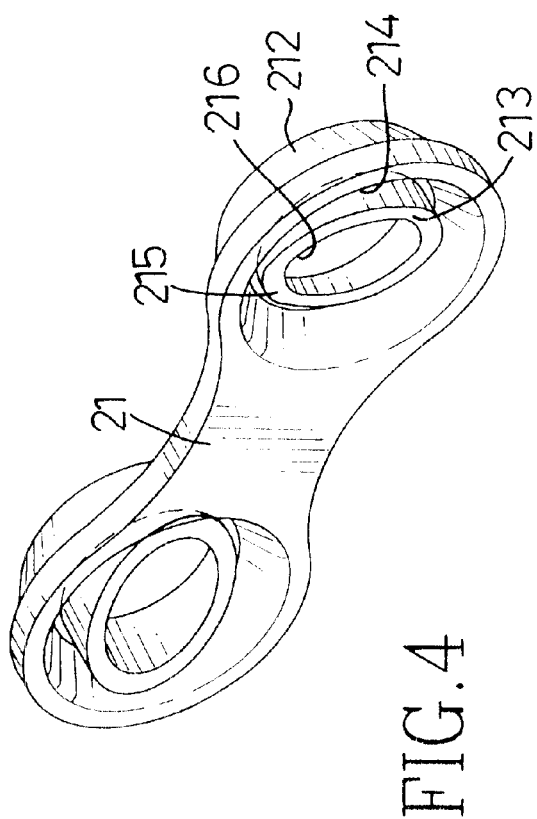
FIG. 4 is a perspective view of the inner plate shown in FIG. 3.
Figure 3:
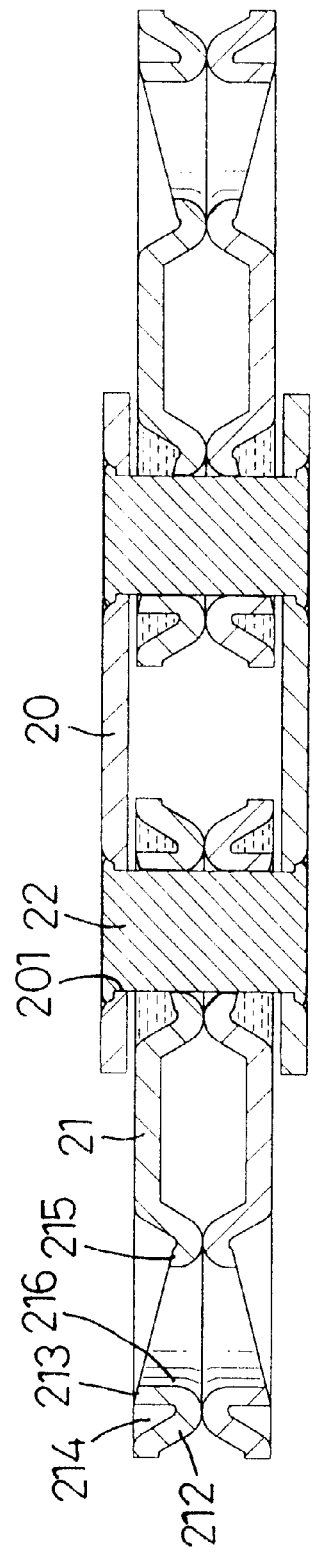
FIG. 3 is a cross sectional view showing a combination of a chain unit of another embodiment.

With reference to FIGS. 3 and 4, another preferred embodiment of the inner plate (21) is shown, wherein the inner plate (21) has two hollow cones (212) oppositely formed on two sides of the inner plate (21) and two tubes (213) each formed on a corresponding one of the hollow cones (212). A space (214) between an inner face of the hollow cone (212) and the tube (213) is defined to receive therein oil. A rivet hole (216) is defined to align with the pin hole (201) in the outer plate (20). From this embodiment, the tube (213) is inclined relative to a top face of the inner plate (21) so that the tube (213) has a lower portion (215). Therefore, when the chain unit having two inner plates (21), two outer plates (20) and a pin (22) is combined in the same manner as described in the embodiment shown in FIG. 1, the oil received in the space (214) seeps to lubricate the pin (22), the outer plates (20) and the inner plates (21) to reduce noise caused by the operation of the chain.

Figure 6:
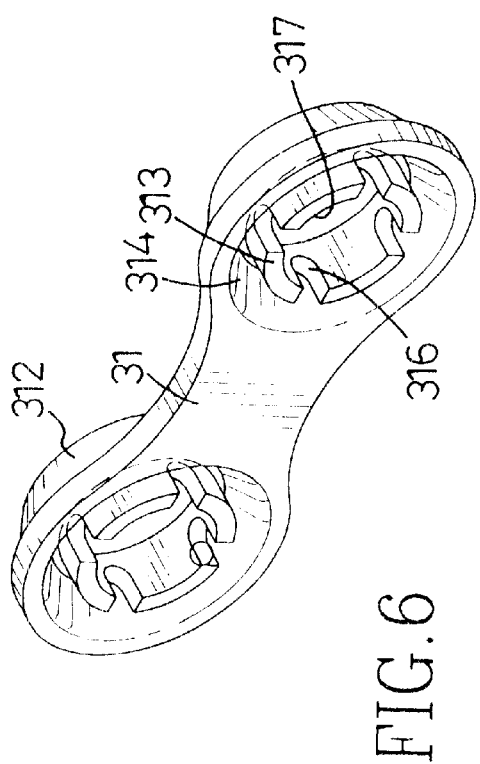
FIG. 6 is a perspective view of the inner plate shown in FIG. 5.
Figure 5:
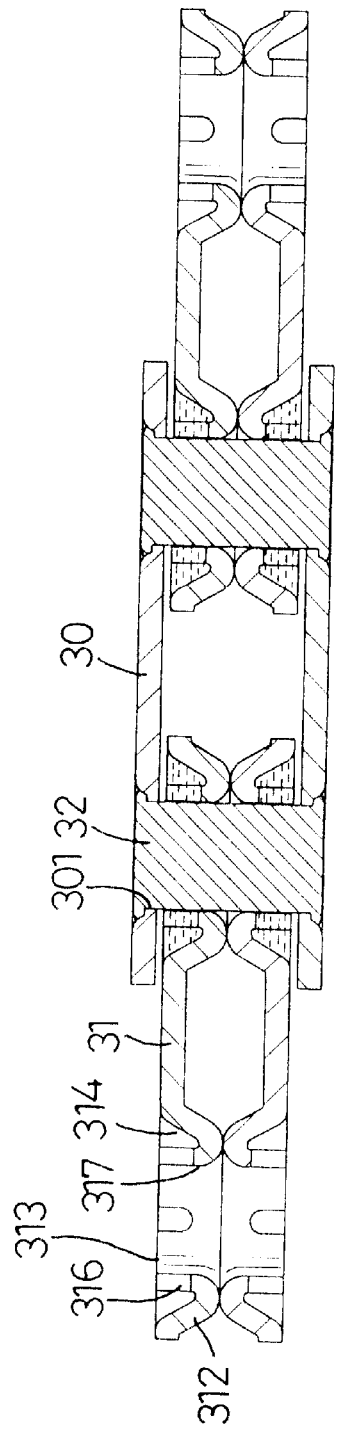
FIG. 5 is a cross sectional view showing a combination of a chain unit of still another embodiment.

With reference to FIGS. 5 and 6, this embodiment shows generally the same structure as described in FIG. 1. That is, the chain unit is composed of two hollow cones (312) oppositely formed on two circular sides of the inner plate (31) and two tubes (313) each formed on a corresponding one of the hollow cones (312) and having multiple cutouts (316) defined in an upper edge of the tube (313). A space (314) between an inner face of the hollow cone (312) and an outer periphery of the tube (313) is defined to receive therein oil. A rivet hole (317) is defined to align with the pin hole (301) in the outer plate (30).

With the structure described in FIG. 5, the oil received in the space (314) seeps out of the space (314) to lubricate the outer plates (30), the inner plates (31) and the pin (32) so as to reduce noise when the chain of the present invention is in operation.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A chain composed of multiple chain units each comprising:
    two outer plates, two inner plates and a pin to secure engagement between the outer plates and the inner plates, wherein
        each outer plate has two circular faces respectively and oppositely formed on a side of the outer plate, two pin holes respectively defined in the two circular faces,
        each inner plate has two hollow cones respectively and oppositely formed on a side of the inner plate, with each hollow cone having a first end, a second end and an inner face extending between the first and second ends, with each of the hollow cones including a tube formed on the second end of the hollow cone, with the tube having an outer periphery interconnected to the inner face, with a space being defined between the inner face of the hollow cone and the outer periphery of the tube to receive therein oil, with a rivet hole being defined in the tube misaligned with the outer periphery and to align with the pin hole in the outer plate,
    whereby when the chain unit is assembled, two inner plates are combined by engaging two tubes together to align the two rivet holes of the respective inner plate and the two outer plates are applied to a respective one of the two engaged inner plates with the rivets holes aligned with the two pin holes respectively so that the pin is applied to extend through the aligned pin hole and the two aligned rivet holes to secure engagement of the chain unit,
    thereby oil in the oil receiving space is able to seep through the rivet holes to lubricate the pin and the outer plates as well as the inner plates.

2. The chain as claimed in claim 1, wherein the tube has an inclined top face relative to a top face of the inner plate.

3. The chain as claimed in claim 2, with the rivet hole defining an inner periphery opposite the outer periphery.

4. The chain as claimed in claim 1, wherein the tube has a top face with multiple cutouts defined in the top face.

5. The chain as claimed in claim 4, with the rivet hole defining an inner periphery opposite to the outer periphery.

6. The chain as claimed in claim 1, with the rivet hole defining an inner periphery opposite to the outer periphery.

7. The chain as claimed in claim 1, with the outer periphery terminating in the rivet hole.

* * * * *